Figure 1:
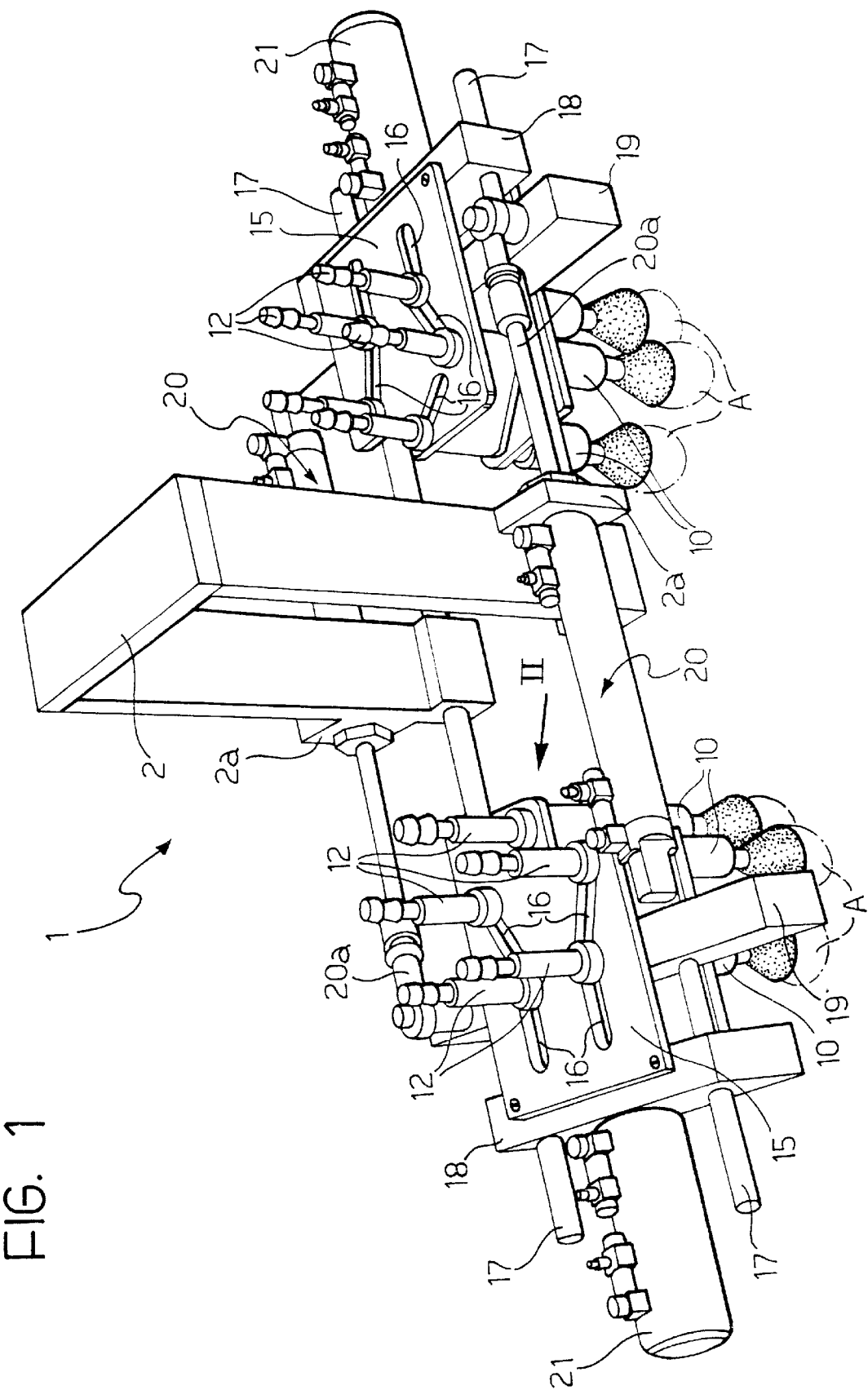

United States Patent
Pedrotto et al.

[11] Patent Number: 5,931,279
[45] Date of Patent: Aug. 3, 1999

[54] PICK-UP DEVICE

[75] Inventors: Gianfranco Pedrotto, Neviglie; Roberto Bertalero, Acqui Terme, both of Italy

[73] Assignee: Soremartec S.A., Belgium

[21] Appl. No.: 08/731,273

[22] Filed: Oct. 11, 1996

[30] Foreign Application Priority Data

Oct. 16, 1995 [CH] Switzerland ............ 2925/95

[51] Int. Cl.⁶ .................................. B65G 25/00
[52] U.S. Cl. ........................................ 198/468.3
[58] Field of Search ............................. 198/468.3

[56] References Cited

U.S. PATENT DOCUMENTS

| | | | |
|---|---|---|---|
| 3,360,102 | 12/1967 | Cummings | 198/468.3 |
| 3,448,865 | 6/1969 | Schroder. | |
| 3,837,472 | 9/1974 | Byerly | 198/218 |
| 4,832,180 | 5/1989 | Ferrero. | |
| 5,273,152 | 12/1993 | Brun | 198/468.3 |
| 5,643,619 | 7/1997 | Oas et al. | 198/468.3 |

FOREIGN PATENT DOCUMENTS 1211985  3/1966  Germany.

*Primary Examiner*—Joseph E. Valenza
*Attorney, Agent, or Firm*—Rothwell, Figg, Ernst & Kurz

[57] ABSTRACT

The pick-up device comprises a plurality of pick-up members connected together and articulated by means of arms so as to be disposed at the vertices of a polygon. Cam surfaces defined by the sides of slots provided in one or more motion plates allow the geometry, and possibly the length of one or more sides of the polygon to be varied. It is thus possible selectively to vary the geometry of the arrangement of articles held by the device during transfer thereof, possibly also causing the distance between groups of separate pick-up members to be varied.

11 Claims, 4 Drawing Sheets

PICK-UP DEVICE

The present invention relates to a pick-up device.

Such a device is known, for example, from U.S. Pat. No. 4,832,180.

The device described in this prior document comprises a plurality of pick-up members, preferably of the sucker type, each of which is intended to hold a respective article disposed in an array of rows extending in at least one direction. The device includes a plurality of generally elongate support elements parallel to one another, intended in use to be orientated in the direction of the rows of articles. Each support element carries an associated respective row of pick-up members extending along the element itself. Drive means make it possible to vary the distance between adjacent support elements in such a way as to be able to adapt its separation selectively to the separation between the rows of articles. This distance can be varied whilst the device transfers the articles supported from the pick-up members to a package, thus adapting the separation of the rows of articles to the dimensions of the package itself. The possibility of being able selectively to vary the distance between the pick-up members of each support element is also envisaged.

In other words, in the said arrangement according to the prior art, the pick-up members are ordered in rows and columns in a matrix structure with the possibility of selectively varying not only the distance between the rows but also the distance between the pick-up members forming part of the same row and consequently the distance between the columns.

In the application to food products, such as, for example, the confectionery products to which explicit reference is made in the earlier document, this structure makes it possible to pick-up products such as chocolates, chocolate eggs etc. disposed in an array, for example at the end of their production line, and to transfer them, for example, to a packaging line, modifying their spatial distribution so as to put them into a more or less compact array, or rather, being more or less close-set than in the array from which they have been picked-up: this, as already mentioned, applies both to the distance between adjacent rows of articles and to the distance between individual articles in each row.

In a field such as that of confectionery products, a field to which reference will continue to be made purely by way of example hereinafter in the present description, the need to develop operations for handling and transfer of articles with simultaneous variation in their relative spatial arrangement arises ever more frequently in a way which cannot be put into practice in an entirely satisfactory manner by resorting to the arrangements such as those described, for example, in the European Patent Application examined in detail above.

In particular, simply to make the arrangement of the products more lively and attractive, for example in a package of confectionery products, there arises the requirement for the products themselves to be no longer ordered in a regular or matrix type of array (to be understood as rows and columns) but on the contrary, disposed in a closed or open polygonal array, for example pentagonal, hexagonal, serpentine etc.

The present invention seeks to provide a solution which can resolve this problem in an optimal manner.

Figure 2:
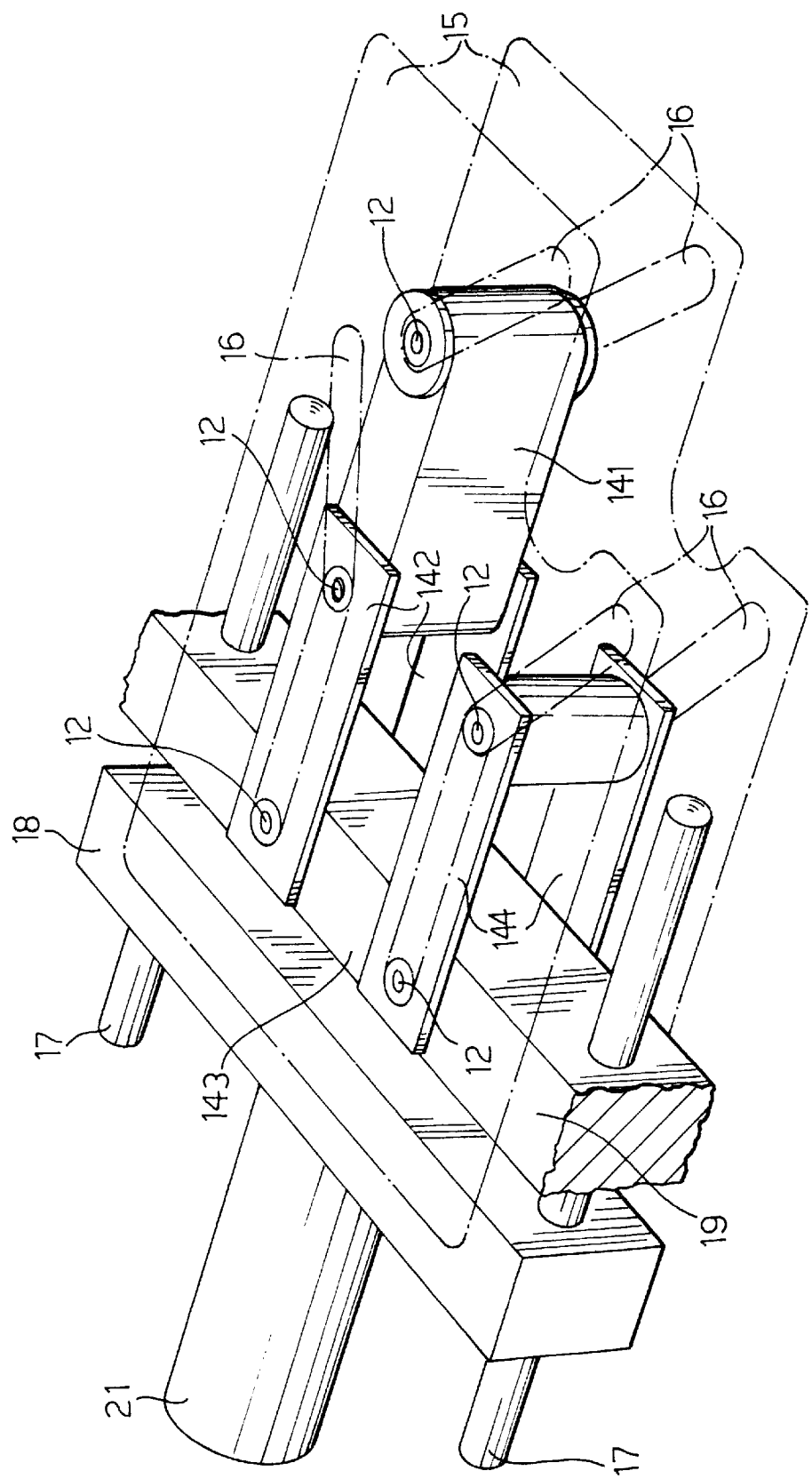
Figure 3:
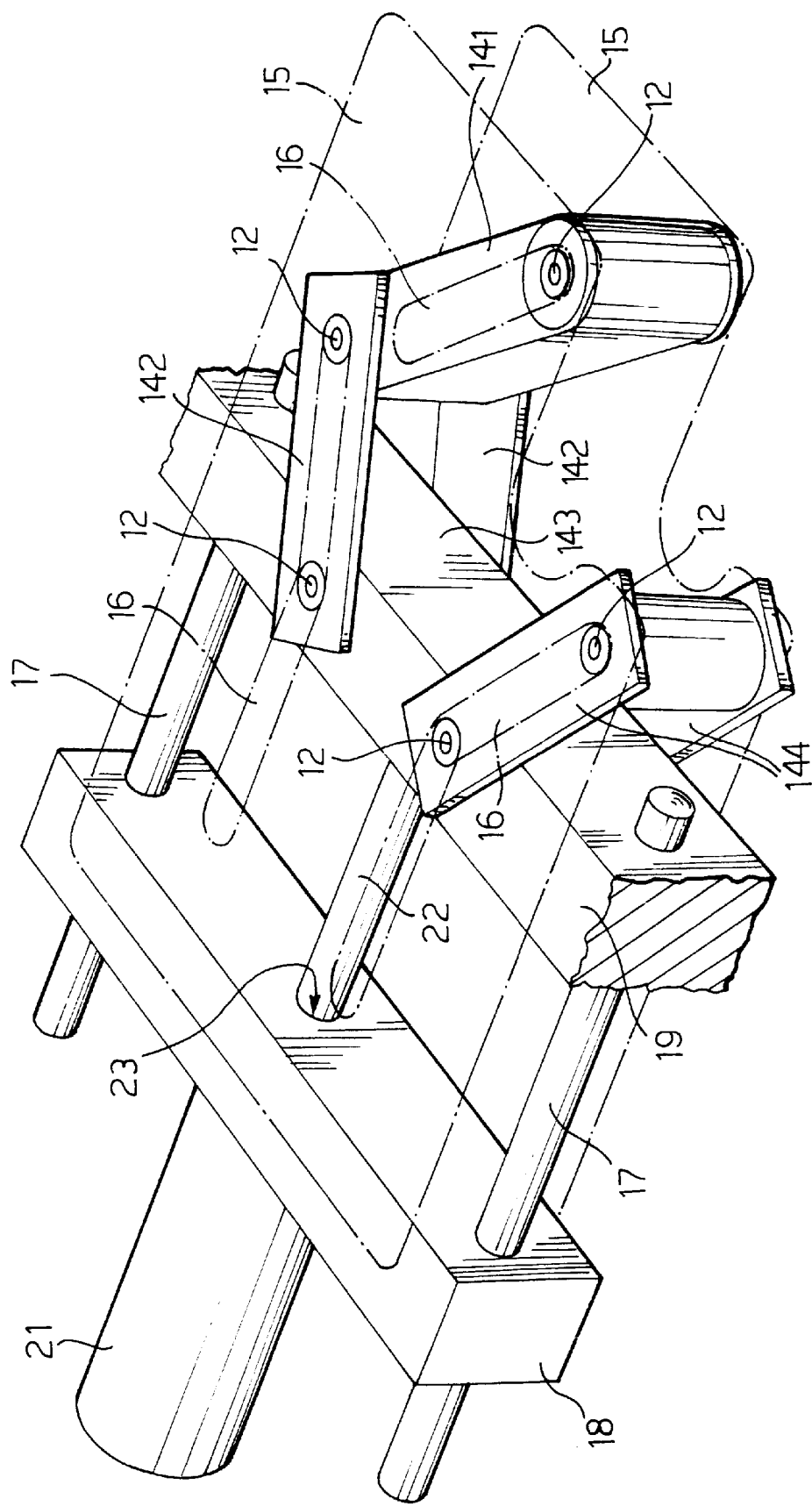
Figure 4:
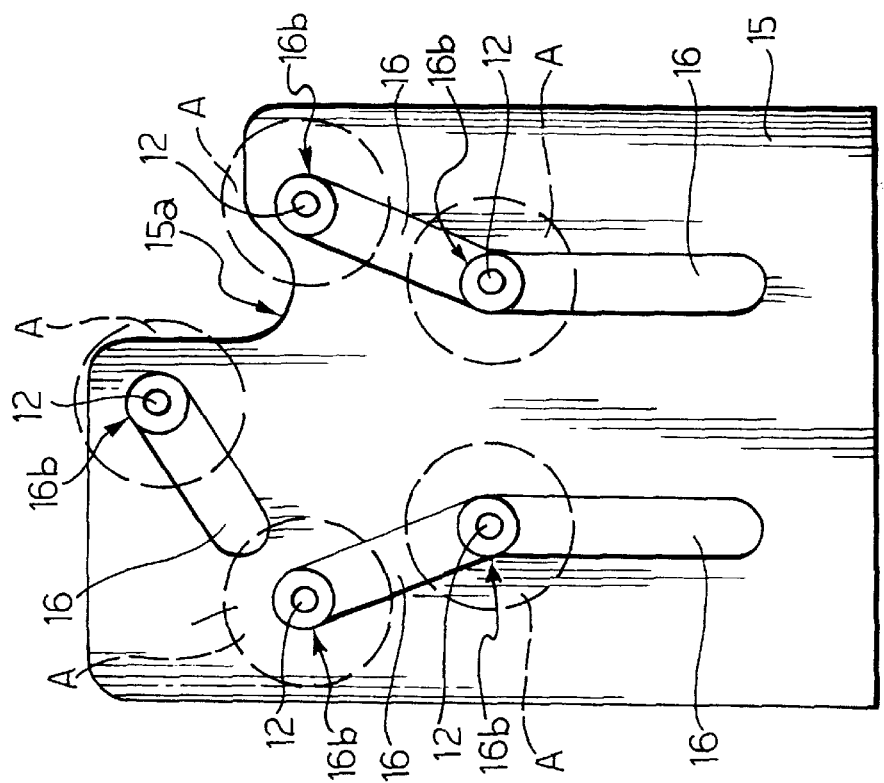
Figure 5:
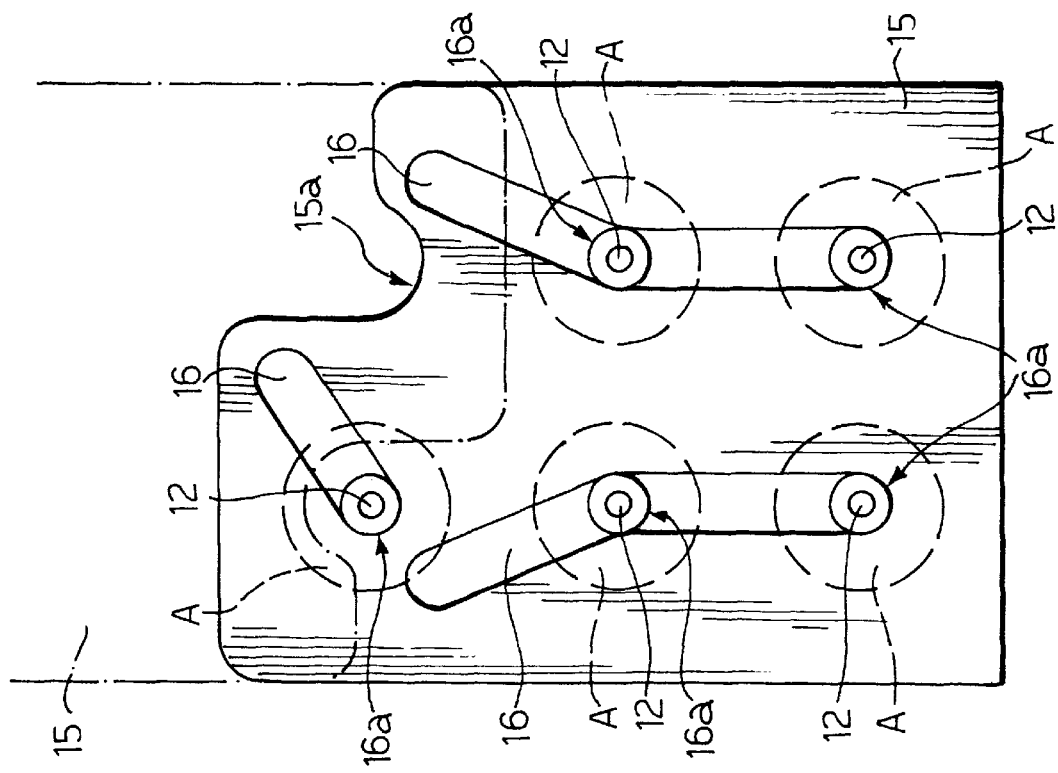

The invention will now be described, purely by way of non-limitative example, with reference to the attached drawings, in which:

FIG. 1 schematically illustrates a pick-up device according to the invention;

FIGS. 2 and 3 are two perspective views, on an enlarged scale, which illustrate, from a point of view approximately corresponding to the arrow II, a part of the device according to the invention in two possible different operating positions; and FIGS. 4 and 5 are two schematic representations respectively corresponding to FIGS. 2 and 3, for better illustrating the principle of operation of the invention.

In FIG. 1 the reference numeral 1 generally indicates a pick-up device (sometimes also called a "hand" or "gripper") intended preferably to be mounted on automatic apparatus such as an automaton or robot (not illustrated), for example to transfer articles constituted, for example, by confectionery products such as chocolates, small chocolate eggs, praline etc from a first conveyor line towards a second conveyor line.

As illustrated in detail in U.S. Pat. No. 4,832,180 to which reference can usefully be made in this respect, the first conveyor line can be constituted, for example, by a conveyor belt along which advances a continuous array of articles ordered in a regular matrix array, that is to say articles disposed in lines (respectively rows and columns) parallel and orthogonal to the direction of advance of the articles on the conveyor.

The second conveyor line can on the other hand be constituted by another conveyor belt along which advances a stream of boxes or parts of boxes (so-called "acetates"). Each box or part of a box is provided within it with a certain number of pockets each of which is intended to receive an article A.

In the following description it will be supposed, in particular with reference to FIG. 5, that the said pockets are arranged in one or more pentagonal arrays, with each array consequently comprising five articles A disposed at the vertices of a regular pentagon. It is, however, underlined that this reference is only an example; the arrays in question could in fact have any different type of shape both as far as the overall geometry is concerned (which could be for example hexagonal or serpentine and consequently defined by any closed or open polygonal shape) and as far as the distance between the various pockets is concerned, and consequently between the articles A, which distance need not be uniformed and constant.

In the arrangement described in U.S. Pat. No. 4,832,180 the second conveyor line extends at the output or discharge end of the first line with the direction of advancement of the boxes on the second line being orthogonal to the direction of advancement of the articles on the first line; naturally the arrangement could be somewhat different, for example with the two lines parallel or skew with respect to one another. The apparatus which carries the pick-up device intended to act on the articles A is disposed in an angular position between the two conveyor lines and is substantially constituted by a column or pillar at the top of which is mounted a generally flag-like pivotable arm which supports the device 1 at its free end. By the effect of the reciprocation (traverse) about the vertical central axis of the column or pillar, the free end of the arm describes a circular path having an angular extent of about 90°. The free end of the arm can thus reciprocate from a first operating position.

In the first operating position the free end of the arm overlies the output end of the first conveyor line. In the second operating position, however, it lies over a second conveyor line.

At the free end of the pivotable arm is mounted a fluid pressure actuator the rod of which, projecting downwardly and movable vertically, carries a device 1 at its lower end.

The operating cycle of the apparatus controlled, (in a known manner) by electronic and fluidic control devices not illustrated, includes the cyclic repetition of the following phases:

rotation of the arm towards the first operating position, with the pick-up device 1 in a raised position, lowering of the pick-up device 1 towards the first conveyor line where the device 1 picks up the articles, return of the pick-up device 1 (and the articles A held by it) to a raised position with respect to the first conveyor line, rotation of the arm towards the second operating position where the articles are transferred towards the second conveyor line, lowering of the pick-up device 1 towards the second conveyor line with consequent release of the articles A and deposition of these into the pockets of the boxes present on the second conveyor line, and return of the pick-up device 1 to the raised position with respect to the conveyor line and return towards the starting position.

All this as described by way of summary, and for reference, corresponds to the general arrangement described in U.S. Pat. No. 4,832,180.

Specifically, the present invention relates to the structure and the manner of operation of the pick-up device 1 illustrated here as provided with two groups of pick-up members 10 with each group comprising five pick-up members 10 preferably disposed for evident reasons of balance, in positions approximately symmetrical with the centre of gravity of the device 1 and in particular with respect to a central portal structure 2 utilised for assembly of the device 1 on to the associated robot or automaton (not illustrated).

It is to be underlined that this is an illustration of purely exemplary character, allied to the fact that, preferably, the device 1 is made in such a way as to be able to operate simultaneously on several boxes, for example two boxes, in such a way as to be able to transfer ten articles A at each pick-up and deposition stroke of the type described above. In practice, the structure described in detail hereinafter, comprising, by way of example five pick-up members, can be reproduced any number of times in a modular structure.

Preferably the members 10 are of the sucker type currently utilised for handling delicate or fragile articles. In practice, each member 10 is substantially constituted by a sucker into the interior of which opens a respective suction tube leading to a main suction duct. This latter is in turn connected to a subatmospheric pressure ("depression") source such as, for example, a vacuum pump (not illustrated).

For a detailed illustration of the structure of the pick-up members it is possible once again to refer to U.S. Pat. No. 4,832,180. It is however stated that the structure and manner of formation of the pick-up members 10 is in itself largely unimportant for the purposes of the invention. The invention itself in fact lends itself to being utilised and put into practice with pick-up members different from the pneumatic pick-up members 10 to which reference is made, by way of example, in the present description: this may include, for example, pick-up members of mechanical type (gripper or the like) electromagnetic type etc.

The essential aspect of the invention lies essentially in the possibility of arranging that, during the transfer operation of the articles A it is possible to vary the relative geometric arrangement of the articles A themselves.

In practice, in the embodiment to which FIGS. 4 and 5 make implicit reference, the articles A are disposed on the original conveyor line in a regular array which, for simplicity of illustration and understanding can be considered as a square mesh array (see FIG. 4).

When the device 1 lowers towards the articles A to pick them up, the pick-up members 10 must therefore be positioned in an array comprising four elements disposed at the vertices of a square plus a fifth element situated at a distance equal to the side of the square along the extension of one of the sides of the said square (again see FIG. 4, where the reference 12 identifies the rods of the various pick-up members 10). This is true independently of the relative orientation of the pick-up device 1 with respect to the array of articles which are to be picked up.

To obtain the desired variation of the disposition of the articles A which have been picked up, the pick-up members 10 must therefore vary in their relative position during the transfer movement and move to a disposition—in the example illustrated here—at the vertices of a regular pentagon, that is to say in a geometry identical to the geometry of the arrangement of the articles within the boxes in which they are to be received (in this respect see FIG. 5).

Once again it is mentioned that the regular pentagon geometry to which reference is made here is purely by way of example in that a different geometry could be used, for example hexagonal, heptagonal, etc and/or irregular polygons.

In the arrangement according to the invention this result is achieved by connecting the pick-up members 10, preferably at their rods 12 defining the suction tubes for the suckers, by means of articulated arms in such a way that the pick-up members 10 constitute the vertices of a polygon which, due to the articulation of the arms 14 at each pick-up member 10, is freely configurable from a geometric point of view.

In the simplest embodiment the said result is obtained simply by making the rod 12 or suction tube of each pick-up member 10 constitute the pivot pin (from the vertical devlopment, in the example illustrated) of a notional chain the links of which are constituted by arms or links each of which has, at its ends, respective holes which allow engagement of a pick-up member 10 (with the possible interposition of bearing elements, although this arrangement is not essential in consideration of the low speed of rotation envisaged).

In the specific case of the embodiment illustrated here, for reasons which will become clearer hereinafter, the various arms in question are constituted by structurally different elements.

In particular, referring to FIG. 2 and moving in an anticlockwise sense starting from the portion of the rod situated furthest to the right, the said arms are defined by:

an arm of solid structure indicated 141;

a first pair of links indicated 142;

a solid central portion, indicated 143, of an actuating body which will be described better hereinafter; and a further pair of links indicated 144.

As a consequence of the connection formed by the arms 141–144 the members 10 can be freely disposed in any geometry definable in the form of a polygon.

In the specific example illustrated this condition is true both for the starting array (pick-up arrangement of the articles A illustrated in FIG. 4, in which the polygon in question is ideally constituted by three sides of a square at the vertices of which are four pick-up devices 10, with a further side constituting the connection to the fifth pick-up member 10), and for the final arrangement assumed by the articles A in view of the deposition on the arrival line (in this case the arrangement illustrated in FIG. 5 in which the polygon in question is defined by four adjacent sides of the regular pentagon geometry).

Given the articulated character of the polygon it can easily be understood that the degree of freedom given by the arrangement according to the invention is extremely wide. In particular, one can consider reversing (ideally) the pick-up and deposition geometry illustrated above by supposing, for example, that the articles A disposed in a pentagonal or five-sided lattice array for example are picked up and deposited in a square or rectangular lattice array.

In this latter respect it is underlined that although the attached drawings make reference—by way of illustration —to an arrangement in which the arms 141–144 are elements of constant length, it is possible to form at least some of these elements as telescopic elements or, in any event, as elements of variable length, with the consequent possibility of arranging that all or some of the sides of the "arrival" polygon are different in length from the sides of the "departure" polygon.

It can in particular be appreciated that both the departure polygon and the arrival polygon can be an entirely or partially closed or open polygon: there is therefore the possibility of disposing the pick-up members 10 and the articles A suspended from them, in any form of polygonal geometry, for example serpentine or spiral.

As far as the movement of the units of the pick-up members 10 and/or of the arms 141–144 which regulate the geometrical disposition is concerned, it is possible to resort to different solutions.

It is possible, for example, to go back to the arrangement described in U.S. Pat. No. 4,832,180 already cited several times above, or else to arrangements of the type adopted for the articulation of the arms of robots.

Taking into account the fact that a device such as the device 1 described above must, above all in the possible application to the food industry, have dimensions which are as small as possible, a solution which has shown itself to be particularly advantageous is that of using cam elements which can be made in an advantageous manner in the form of slots provided in one or more plates associated with the pick-up members 10 and, preferably, with the rods of these.

In the embodiment illustrated here it is envisaged that respectively above and below the region in which the rods of the pick-up members 10 are connected to the arms 141–144 there are provided one or, better, several plates 15, typically two, in which are formed slots 16 in the geometry illustrated in more detail in the views of FIGS. 4 and 5.

The shape of the slots 16, each of which is intended to define an associated sliding track for one or more rods 12 of the pick-up members 10, is defined on the basis of elementary geometric considerations by arranging that a general translation movement the plates 15 causes the passage of the pick-up members 10 from the previously defined "departure" geometry to the "arrival" geometry.

Whether they cooperate with a single rod 12 or with several rods the slots 16 have two respective pluralities of recognised locations, respectively indicated 16a and 16b in FIGS. 4 and 5.

The first locations 16a correspond to the positions occupied by the pick-up members 10 (that is to say by their rods 12) in the departure disposition supposed, in this case, to correspond to the square lattice array in which the articles A are disposed in FIG. 4. The other locations 16b correspond on the other hand to the geometric "arrival" arrangement (pentagonal in the illustrated example) as shown in FIG. 5.

The paths of the slots 16 therefore start as connections (rectilinear in the illustrated embodiment) between the locations 16a and 16b.

From observation of FIGS. 4 and 5 it is evident that, nominally, in the plate or plates 15 there must be present one slot 16 for each pick-up member 10. Although in many cases it can effectively be like this, in other cases, as in that illustrated, it can better be achieved that the geometric departure and arrival geometries of the members 10 be such that the arrival position, that is the location 16b, of one member 10 coincides, or is very close, to the departure position, that is to the location 16a, of another member 10.

For example, in the case of the geometric arrangement of FIGS. 4 and 5, it happens that the positions occupied in FIG. 5 by two members (rods 12) forming the lower base of the pentagon approximately correspond to the positions occupied in FIG. 4 by two members (rods 12) situated in intermediate positions in the starting arrangement. Consequently, the respective locations 16a and 16b merge so that the two associated slots (one for each member 10) join together: in the illustrated example, for five members 10 there are therefore present only three slots 16, a short one (in the top position in FIGS. 4 and 5) and two adjacent longer ones, each of which has a cranked profile in that it represents in reality the ideal fusion of two "consecutive" short slots.

It is also easy to understand, still through the drawing of the paths of the slots 16, how it is possible to arrange that not only the geometry, but also the length of one or more of the sides of the polygon (i.e. length of one or more arms 141–144) varies by the effect of the movement of the plates or plate 15.

It is self evident that the variants and possibilities of development of the solution described are very extensive: for example it is possible to think of solutions in which, starting from a departure geometry there is a first geometry variation, for example to obtain deposition of a first set of products, and then a second geometry variation, to obtain deposition of a second series of products in a still different geometry.

For the movement of the members 10 it is possible to provide different solutions.

For example, the embodiment illustrated in the drawings operates in the following manner.

The lower ends of the lateral arms of the portal element 2 support two rods 17, for example cylindrical rods, which, being maintained horizontal in the normal operating position, define the larger sides of an elongate rectangular framework.

The smaller sides 18 of this framework are defined by small bars, here of rectangular or square section, slidably engaged on the opposite ends of the rods 17. The plates 15 of each pair are fixed, for example by screws, respectively on the upper and lower faces of each side 18.

To each side 18 there is then associated, on its inner side facing the portal element 2, a movable unit 19 also constituted for example, by a body in the form of a small bar the central portion of which constitutes the arm 143 of the connecting polygon between the pick-up members 10.

Reference numeral 20 indicates two first fluid pressure actuators, one for each larger side of the framework defined by the rods 17, which act between a respective pillar of the portal element 2, for example here being fixed with the cylinder to a flange 2a projecting from the portal element, and a respective movable unit 19, for example here being connected to the free end of the rod 20a. The arrangement could naturally be reversed.

The reference numeral 21 indicates two further fluid pressure actuators, one for each minor side of the frame defined by the rods 17, acting respectively between one of the sides 18 and the movable unit 19 associated with it. Typically, although the arrangement may be reversed, each actuator 21 is fixed to its cylinder outside the side 18 whilst the rod 22 (FIG. 3) passes slidably through a hole 23 in the side 18.

The relative movement with respect to the side 18 of the unit 19, which acts on the actuating polygon of the members 10 in that its central part 143 constitutes one arm of this polygon, produces the relative movement of the rods 12 and the slots 16 formed in the plate 15 fixed to the side 18 thus obtaining the desired passage of the members 10 between the conditions of FIGS. 2 and 4 and the condition of FIGS. 3 and 5, and vice versa. The relative movement in the two senses is obtained by selectively controlling the respective actuators 21 in the two directional senses.

The actuation of each of the actuators 20 on the other hand allows the assembly formed, on each side of the portal element 2 itself, by a body 18, the movable member 19 associated with it and by the actuators 21, 22 which connect them, to slide along the rods 17 with respect to the portal element 2, thereby assuring the relative movement.

The possibility, so to speak, of widening and narrowing the said assemblies of parts with respect to the portal element 2 confers further flexibility of operation on the device according to the invention.

In fact, for example in the pick-up position of FIG. 4, it is possible to lock the two assemblies of pick-up members 10 against one another under the portal element 2 as schematically indicated in FIG. 4. Here, with the chain line there is indicated a profile of one of the plates 15 of the complementary assembly which is advanced in co-penetration to bring the rod of one of its pick-up members to engage the notch indicated 15a. In these conditions the two arrays of five pick-up members 10, each ordered in a generally "6" shape arrangement (again see FIG. 4) are disposed back to back in a complementary manner in such a way that the assembly of ten pick-up members 10 is ordered in two parallel rows each comprising five equidistantly spaced members. This makes it possible to pick up two corresponding sets of articles A which, upon transfer, are to be ordered in pentagonal arrays as described above, with the action of the actuator 21, separated by moving each pentagonal array away from the portal element 2, facilitating the introduction of the arrays into the associated packages.

The passage of the pick-up members 10 from the "departure" geometry to the "arrival" geometry (and the subsequent return to the departure geometry) is however ensured with extreme precision, above all when use is made of movement effected by cam surfaces such as the sides of the slots 16.

The arrangement described therefore lends itself to being put into practice in an ideal manner in an industrial environment where the requirements of precision must be allied to very high working rates.

What is claimed is:

1. A pick-up device, comprising:

a first array of movable pick-up members;

articulated linkage members directly connecting pick-up members in said first array to each other, the pick-up members being located at pivot points of said articulated linkage members; and guide means for guiding movement of said pick-up members, said guide means comprising cam surfaces along which said pick-up members slide;

whereby the pick-up members move in coordinated, linked fashion from a first configuration in which the pick-up members are located at the vertices of a first polygon to a second configuration in which the pick-up members are located at the vertices of a second polygon.

2. The pick-up device of claim 1, wherein said first polygon is a closed polygon.

3. The pick-up device of claim 1, wherein said first polygon is an open polygon.

4. The pick-up device of claim 1, wherein said second polygon is a closed polygon.

5. The pick-up device of claim 1, wherein said second polygon is an open polygon.

6. The pick-up device of claim 1, wherein said cam surfaces comprise walls of slots provided in at least one guide plate member.

7. The pick-up device of claim 1, wherein said first and second polygons have some common vertices.

8. The pick-up device of claim 1, further comprising an actuator system which causes said pick-up members to move between said first and second configurations.

9. The pick-up device of claim 1, further comprising:

a second array of movable pick-up members;

articulated linkage members directly connecting pick-up members in said second array to each other, the pick-up members in said second array being located at pivot points of said articulated linkage members; and guide means for guiding movement of the pick-up members in said second array;

whereby the pick-up members in said second array move in coordinated, linked fashion from a third configuration in which the pick-up members of said second array are located at the vertices of a third polygon to a fourth configuration in which the pick-up members of said second array are located at the vertices of a fourth polygon.

10. The pick-up device of claim 9, further comprising drive means for selectively varying the distance between said first and second arrays of pick-up members.

11. The pick-up device of claim 10, further including a frame comprising guide means along which said first and second arrays of pick-up members move toward and away from each other.

* * * * *